(12) United States Patent
Klaiber et al.

(10) Patent No.: US 6,976,705 B2
(45) Date of Patent: Dec. 20, 2005

(54) PASSENGER SAFETY DEVICE FOR A VEHICLE

(75) Inventors: Uwe Klaiber, Heidenhein (DE); Jürgen Völk, Langenau (DE); Oliver Glöckler, Nersingen (DE); Heinrich Einsiedel, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 149 days.

(21) Appl. No.: 10/630,966

(22) Filed: Jul. 31, 2003

(65) Prior Publication Data
US 2004/0075256 A1 Apr. 22, 2004

(30) Foreign Application Priority Data
Aug. 9, 2002 (DE) .................................. 102 37 401

(51) Int. Cl.⁷ .......................... B60R 21/16; B60R 21/22
(52) U.S. Cl. .................................. 280/743.1; 280/730.2
(58) Field of Search ........................... 280/730.2, 743.1

(56) References Cited

U.S. PATENT DOCUMENTS

| | | |
|---|---|---|
| 5,022,675 A | 6/1991 | Zelenak, Jr. et al. |
| 5,478,113 A | 12/1995 | Rogers |
| 5,746,690 A | 5/1998 | Humbarger et al. |
| 6,110,094 A | 8/2000 | Wallentin et al. |
| 6,231,070 B1 | 5/2001 | Sunabashiri et al. |
| 6,364,349 B1 | 4/2002 | Kutchey et al. |
| 6,626,456 B2 * | 9/2003 | Terbu et al. .............. 280/728.2 |
| 6,685,219 B1 * | 2/2004 | Yamaji et al. ........... 280/730.2 |
| 6,830,262 B2 * | 12/2004 | Sonnenberg et al. ..... 280/730.2 |
| 6,851,707 B2 * | 2/2005 | Bakhsh et al. .......... 280/730.2 |
| 2002/0036395 A1 | 3/2002 | Bakhsh et al. |
| 2002/0158451 A1 * | 10/2002 | Nusshor .................. 280/730.2 |

FOREIGN PATENT DOCUMENTS

| | | |
|---|---|---|
| DE | 197 36 243 A1 | 3/1998 |
| DE | 197 19 524 C1 | 11/1998 |
| EP | 1 314 618 A2 | 5/2003 |
| EP | 0 980 796 A3 | 9/2003 |
| GB | 2 328 410 A | 2/1999 |

* cited by examiner

*Primary Examiner*—Ruth Ilan
(74) *Attorney, Agent, or Firm*—Foley & Lardner LLP

(57) ABSTRACT

A passenger safety device in which an airbag is disposed in the roof area of the vehicle, especially in the area of the roof rail of the vehicle, and in which the airbag of the airbag is stowed at least partially rolled up in the passenger safety device.

20 Claims, 5 Drawing Sheets

Fig. 2
Fig. 3
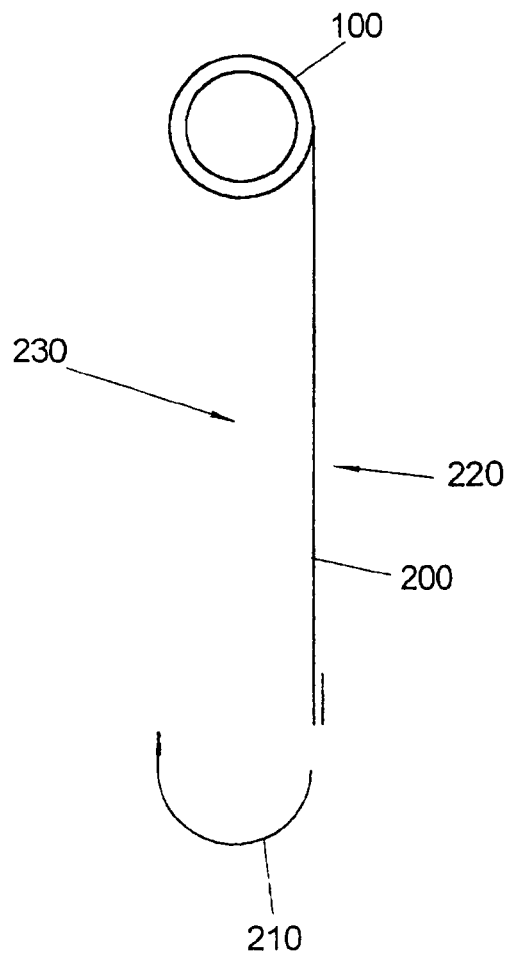
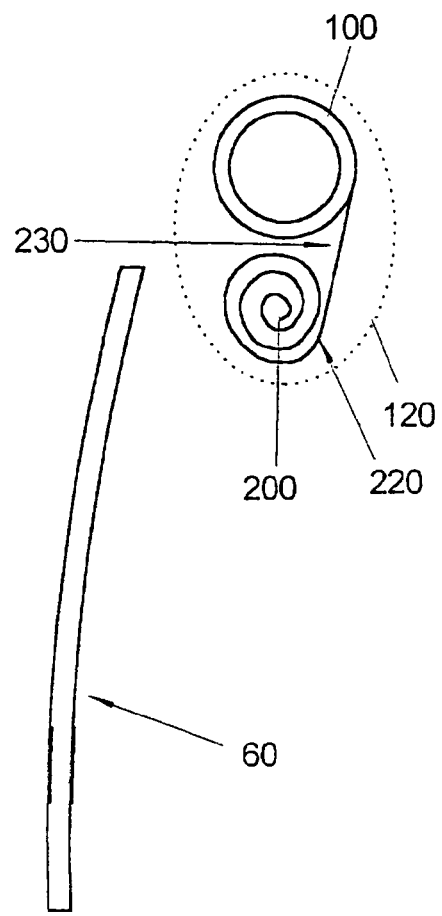

PASSENGER SAFETY DEVICE FOR A VEHICLE

The present invention is directed at providing a passenger safety device for a vehicle that, in case of an accident, reliably protects the head of a passenger against colliding with a lateral wall or a windowpane of the vehicle.

According to an exemplary embodiment of the present invention, a safety device is provided that includes an airbag arranged for passenger protection in the roof area of the vehicle. When the vehicle is involved in an accident, the airbag is then inflated and the lateral wall of the vehicle is covered by the airbag such that the passenger's head can no longer collide with the lateral wall.

In certain situations, the lateral wall of the vehicle may include a side window, the passenger safety device then in like manner protects against the collision of the head against the side window. In order at the same time to enable the airbag to deploy correctly if the passenger is situated, especially with his head, very close to the lateral wall (or side window), it is provided by the invention for the airbag to be stowed in the passenger safety device at least partially rolled up. By this measure an especially reliable deployment of the airbag is assured even if the passenger is very close to the lateral wall and the inflating airbag comes in contact with the passenger. If, during the inflation of the airbag, the bag collides with the head or other part of the passenger's body, the rolled-up airbag will roll laterally against the passenger, so that even then the desired deployment of the airbag is accomplished.

If the passenger safety device is used in the area of the side window, it reliably protects also against any outward thrusting of any parts of the passenger's body.

In accordance with another embodiment of the present invention, the passenger safety device includes an airbag that is wound into a roll. The airbag is rolled up so that the side of the airbag facing the passenger is on the outside of the roll and the outer side of the airbag facing the lateral wall or side window is on the inner side of the roll. Due to the prescribed rolling arrangement of the airbag, the airbag it is substantially assured that the airbag will unroll in the area or gap between the lateral wall and the passenger. Also, the airbag unfolds and inflates concretely thus substantially assuring that the airbag will always unfold in the gap area between the lateral wall and the passenger even if the airbag strikes the passenger as it unfolds and inflates.

In certain situations, the head of the passenger constitutes an obstacle to the deployment of the airbag if the airbag is rolled up such that the airbag roll wound in the prescribed direction unwinds and is deployed in the area of the level of the passenger's head. By this measure, therefore, it is brought about that the wound-up portion of the airbag envelope will always impact upon the passenger if he is too close to the lateral wall. An embodiment of the present invention provides for a reliable and rapid deployment of the airbag by reversing the rolling direction of the airbag at least once during the rolling of the airbag prior to storage to thereby form an inner rolled airbag which is wound in an opposite direction within the outer second rolled airbag.

According to another embodiment of the present invention, a rolled airbag is provided in which the inner rolled airbag has the prescribed winding direction and is disposed such that it is rolled up in the region of the level of the passenger's head. Reliable deployment of the airbag can be achieved even when the outer airbag has been rolled in the same prescribed rolling direction and is disposed such that it unrolls in the region of the level of the passenger's head.

According to another embodiment of the present invention, the rolled airbag may also include accordion pleats in order to increase the deployment speed and the inflation speed. However, the accordion pleats should be arranged outside of the region in which the passenger's head is located, since—as explained above—the airbag is to be rolled up in this region, especially in the prescribed rolling direction.

To protect the airbag in its container it is considered advantageous for the airbag to be surrounded in the container by a protective jacket or a module jacket.

To achieve a uniform and rapid inflation of the airbag it is considered advantageous if a gas distributing device, especially a fill tube or fill hose, is arranged between the airbag and the gas generator so as to achieve a uniform inflation of the airbag over the entire width of the latter. For this purpose it is considered advantageous if the fill tube or fill hose is arranged parallel to the length of the roof rail of the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 2 and 3 schematically depict an arrangement for the storage and deployment of an airbag according to an embodiment of the present invention.

DETAILED DESCRIPTION

Figure 1:
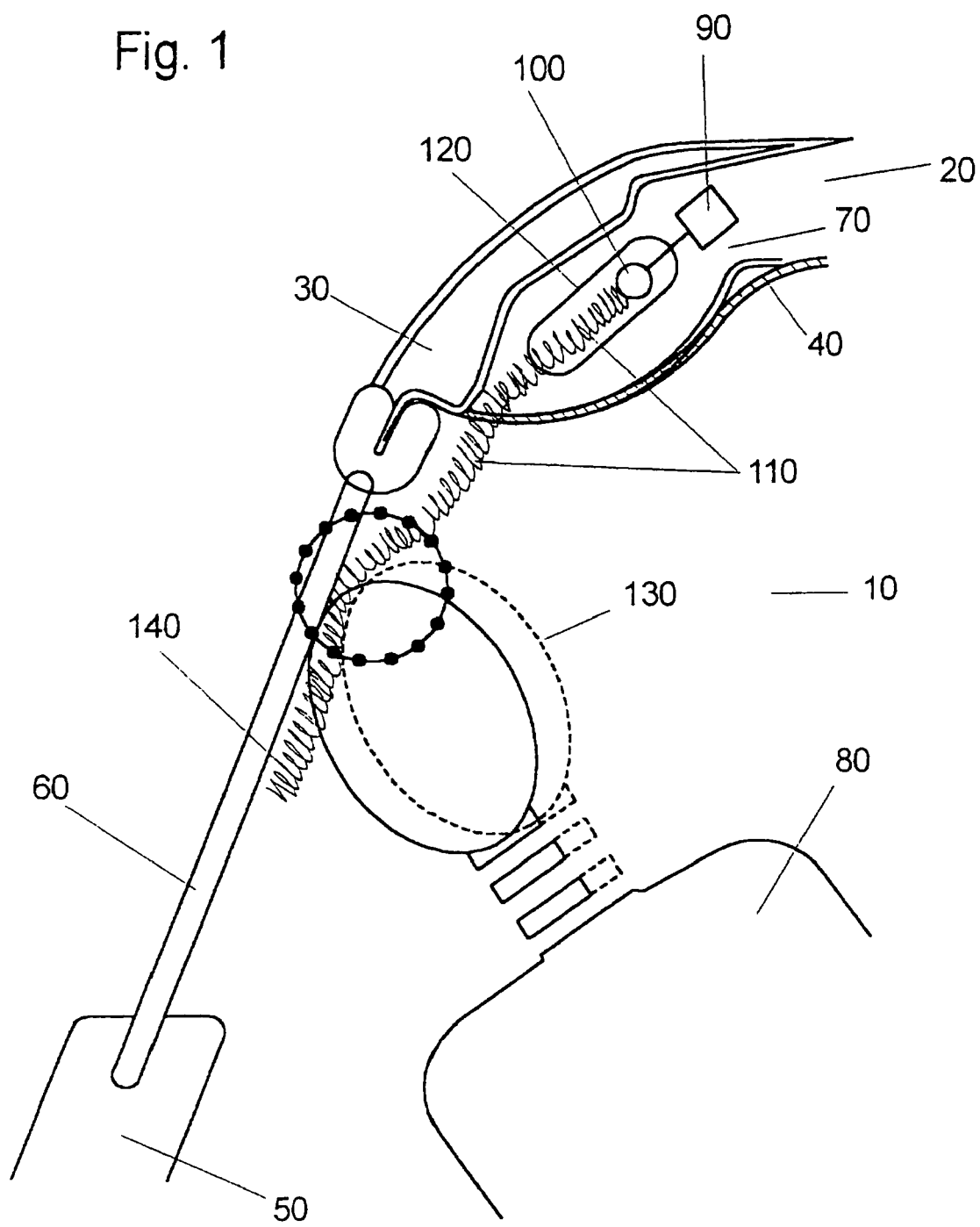
FIG. 1 depicts a portion of a vehicle in section along with a schematic depiction of a passenger safety device according to an embodiment of the present invention.

FIG. 1 shows the lateral part of a vehicle 10 in section. The vehicle's roof 20 includes a roof rail 30 as well as a headliner 40 clothing the roof 20 on the vehicle's interior. A car door 50 with a side window 60 is also disclosed in FIG. 1.

Near the roof rail 30 there is a passenger safety device 70 for protecting a passenger 80 in case of an accident. The passenger safety device 70 especially protects against a side collision or the consequences of a rollover, as described further below. The passenger safety device 70 especially prevents the outward thrusting of parts of the passenger's body.

The passenger safety device includes a gas generator 90, preferably a cold gas generator or a hybrid gas generator. The gas generator 90 is connected to an airbag 110 by a fill tube 100 employed as a gas distributing system to distribute gas for inflating the airbag 110 in the case of an accident. The inflating airbag is shown in FIG. 1, and it can be seen that a portion of the airbag 110 is still inside of the passenger safety device 70, namely in a module sheath 120 accommodating the fill tube 100 and the airbag 110, whereas another portion of the airbag 110 is already deployed and has thrust itself between the head 130 of the passenger and the side window 60.

The airbag 110, as seen perpendicular to the plane of drawing, i.e., in the longitudinal direction of the vehicle, passes along the lateral roof frame, preferably from the front A-frame to the rear D column of the vehicle. The fixation of the airbag and other parts of the passenger safety device is performed preferably in the body shop.

According to the exemplary embodiment of the present invention shown in FIG. 1, the airbag 110 is stored in the module sheath 120 at least partially rolled up, and forms an airbag roll 140 which deploys by unrolling. The rolling direction of the airbag roll 140 is chosen such that the side facing the passenger 80 is on the outside and the side facing the window glass 60 is on the inside of the roll.

The deployment of the airbag 110 thus takes place—at least partially—through the unrolling of the airbag roll 140. Thus—unlike an accordion-folded airbag—it is assured that a reliable deployment will take place even if the space between the side window 60 and the passenger's head 130 is very small. This is to be concretely attributed to the fact that, in view of the possibility of striking the head 130 of the passenger due to its rolling direction (cf. FIG. 3), the airbag will always unroll toward the side window 60 and thus unroll almost necessarily into the space or gap remaining between the head 130 and side window 60. In the case of an airbag stored by conventional accordion folding, however, in the event that the airbag envelope strikes the head 130, deployment would be blocked as a rule and the airbag would under some circumstances deploy in the region above the head 130 of the passenger 80.

FIG. 2 discloses a first embodiment of the present invention disclosing the stowing of the airbag 110 in the module sheath 120 according to FIG. 1. FIG. 2 shows the fill tube 100 and the still empty airbag 200 spread out flat. The airbag 200 is rolled up in the direction of the arrow 210 and is then stowed in the module sheath 120 of the passenger safety device 70 according to FIG. 1.

FIG. 3 shows the airbag 200 rolled up as in FIG. 2, which is contained with the fill tube 100 in the module sheath 120. The rolled-up airbag 200 thus forms the airbag roll 140 according to FIG. 1.

FIG. 3 furthermore shows the side window glass 60, thus showing the position in space of the airbag 200 and fill tube 100. As shown in FIG. 3, the passenger safety device, i.e. the rolled airbag 200 and the fill tube 100 are located in the upper lateral area of the vehicle directly adjacent to the side window 60.

Furthermore, as shown in FIGS. 2 and 3, the rolling direction when the airbag 200 is wound up is chosen so that the side 220 facing the passenger is on the outside and the side 230 facing the side window glass 60 is on the inside of the rolled up airbag.

Figure 4:
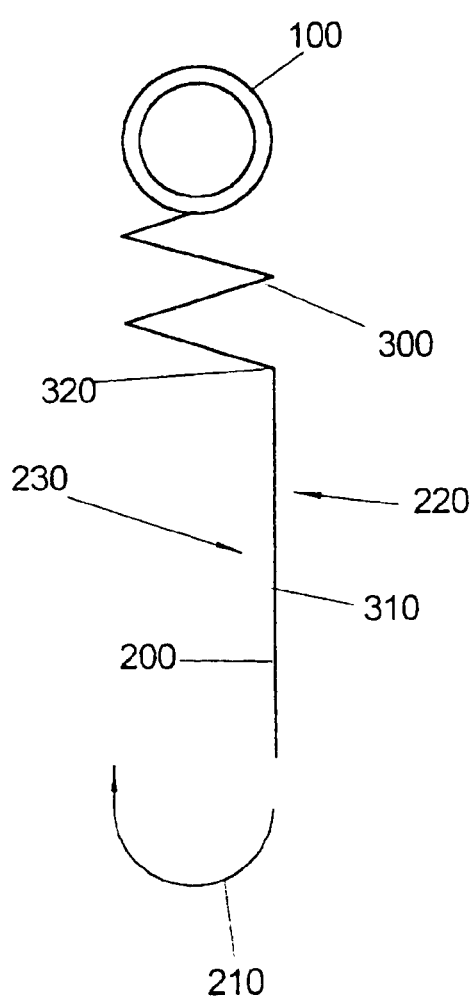
FIGS. 4 and 5 schematically depict an arrangement for the storage and deployment of an airbag according to another embodiment of the present invention.
Figure 5:
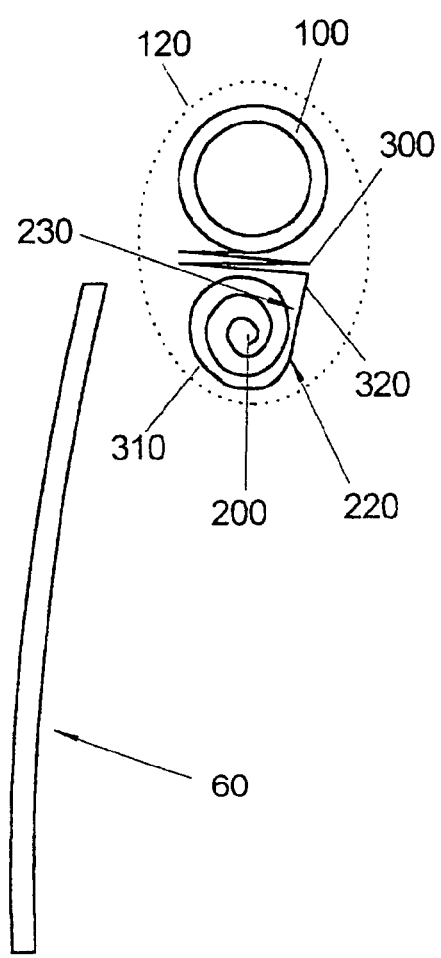

FIGS. 4 and 5 disclose a second exemplary embodiment of a folded and stored airbag 110 located in the module sheath 120.

As shown in FIG. 4 the still empty, outspread airbag can again be seen, which is to be rolled up in the direction of the arrow 210. Unlike the embodiment in FIGS. 2 and 3, the airbag shown in FIGS. 4 and 5 includes both a rolled portion 310 and an accordion-folded portion 300. The side of the airbag 200 facing away from the fill tube 100 is first rolled (portion 310) up to a point of transition at which it shifts from the roll to the accordion pleats 300.

The location of the transition point 320 is chosen so that, in the event of a deployment of the airbag 200, the rolled portion 310 is at the level of the passenger's head, so that the unwinding of the airbag 200 at the passenger's head is achieved. The "height" of the transition point 220—with the airbag unrolled—is located above the level of the passenger's head.

FIG. 5 shows the airbag 200 in its stowed or "collapsed" condition—i.e., wound up and accordion-folded—as in FIG. 4, and in the "installed" state—i.e., packed in the module sheath 120. Furthermore, the side window glass 60 is again shown in FIG. 4 to explain the position of the airbag 200 and fill tube 100 relative to the lateral wall or side window 60.

It can also be seen that the winding direction when the airbag 200 is rolled up has been chosen so that the side 220 facing the passenger is on the outside and the side 230 facing the side window 60 is on the inside.

Figure 6:
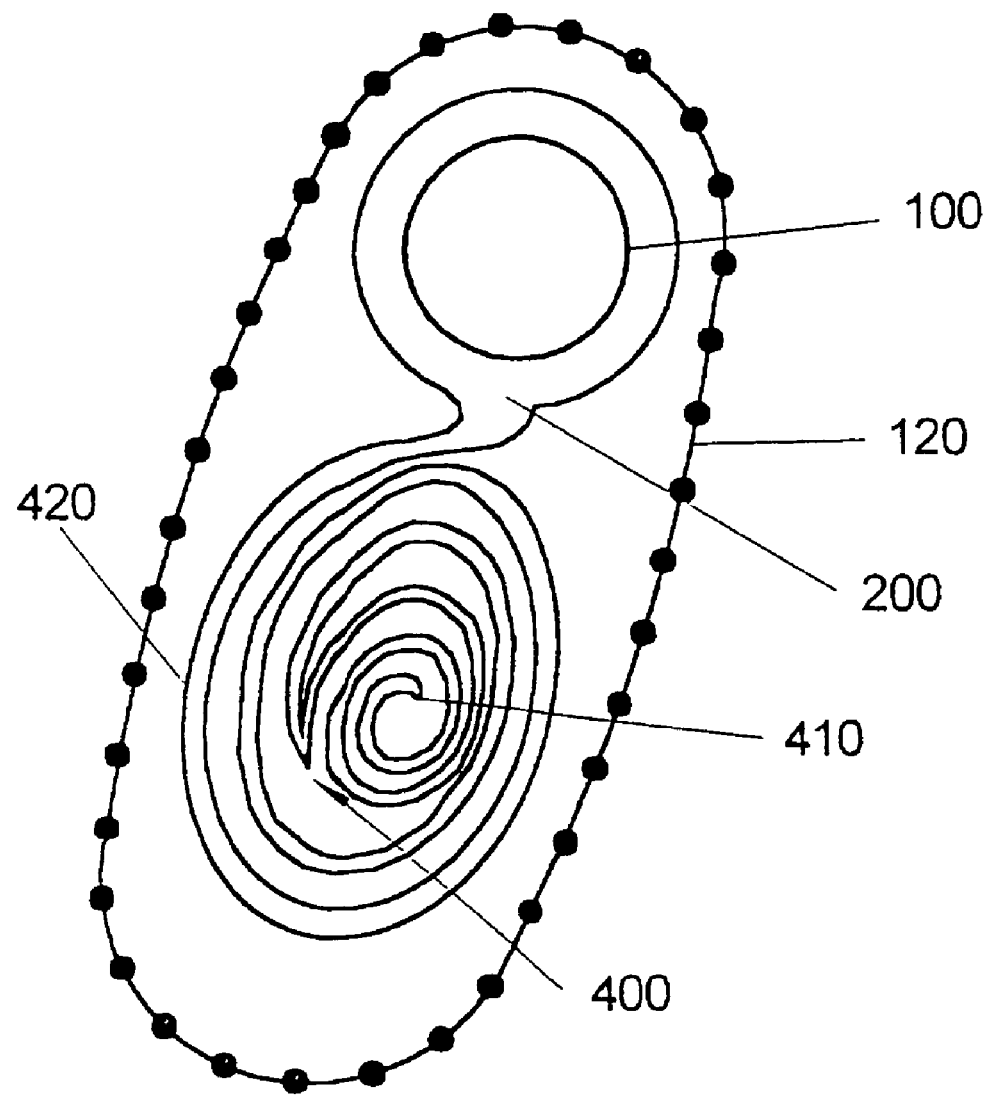
FIG. 6 schematically depicts an arrangement for the storage of an airbag according to an embodiment of the present invention.

FIG. 6 shows a third embodiment for the packing of the airbag 200 in the module sheath 120 according to FIG. 1. In FIG. 6 is seen the module sheath 120 which surrounds the fill tube 100 and the airbag 200. In this third embodiment the end of the airbag 200 remote from the fill tube 100 is first rolled up clockwise. At a reversal point 400 the winding direction is reversed, however, and the airbag roll obtained up to then is rolled in the opposite direction—i.e., counterclockwise—into the remaining portion of the airbag. Thus, an inner airbag roll (rolled clockwise) 410 is formed, which is rolled (counter-clockwise) in an outer airbag roll 420.

The position of the reversal point 400 is selected such that the one of the two airbag rolls in which the side facing the passenger is on the outside deploys in the region of the passenger's head.

Figure 7:
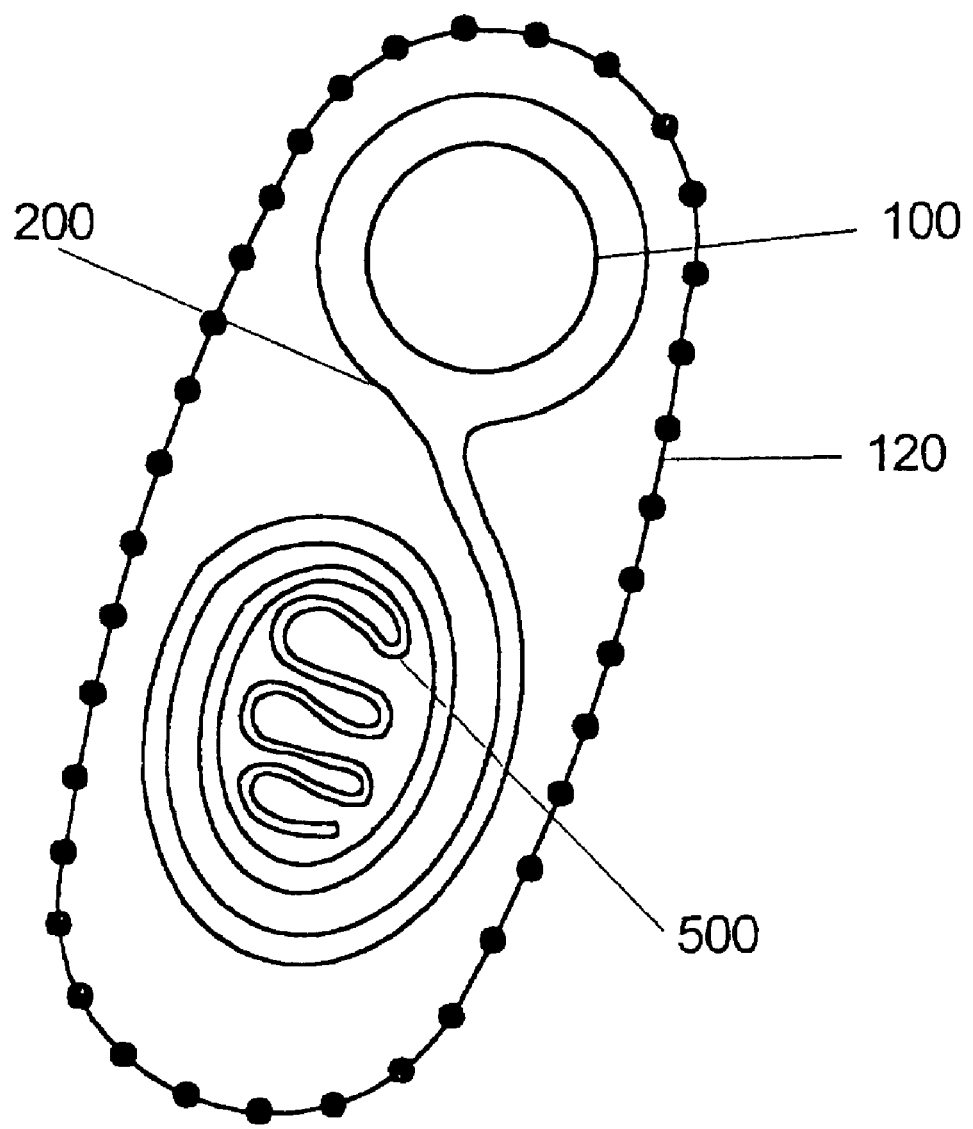
FIG. 7 schematically depicts an arrangement for the storage of an airbag according to an embodiment of the present invention.

FIG. 7 shows a fourth embodiment for the storage of the airbag 110 in the module sheath 120 according to FIG. 1.

It can be seen that the airbag 200 is first accordion-folded in the region of its end remote from the fill tube 100, and after a transition point 500 it is then rolled up. Advantageously the rolling direction is in that case chosen so that when the airbag 200 unrolls the side 220 facing the passenger is on the outside and the side 230 of the airbag 200 facing the side window is on the inside.

The priority application, German Patent Application No. DE 102 37 401.5 filed Aug. 9, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A passenger safety device for a vehicle comprising:
   an airbag stored in an at least partially rolled up condition in an area of a roof rail of the vehicle,
   wherein the airbag is configured to inflate in the case of an accident by a gas generator of the passenger safety device so that the airbag deploys in the area between the head of the passenger and a lateral wall of the vehicle and protects the head of the passenger against colliding with the lateral wall,
   wherein at least a portion of the airbag is rolled up in a prescribed winding direction to form an airbag roll arranged so that the side of the airbag configured to face the passenger after deployment of the airbag faces outward in the roll and the side of the airbag configured to face the lateral wall after deployment of the airbag faces inward in the roll, and wherein the winding direction of the airbag in the airbag roll is reversed at least once to thereby form of an inner first airbag roll which is rolled up in an outer second airbag roll of the opposite rolling direction.

2. The device of claim 1, wherein the airbag is rolled up so that the airbag roll unrolls and deploys at a level in the vicinity of a head of a passenger.

3. The device of claim 1, wherein the inner airbag roll has the prescribed rolling direction and is arranged such that, when the airbag is inflated, it unrolls in an area at the level in the vicinity of the head of the passenger.

4. The device of claim 1, wherein the outer airbag roll has the prescribed rolling direction and is arranged such that upon the inflation of the airbag it unrolls in an area at the level in the vicinity of the head of the passenger.

5. The device of claim 1, wherein a module sheath surrounds the airbag.

6. The device of claim 1, further comprising:
a gas distributing device located between the airbag and the gas generator to thereby ensure uniform distribution of gas into the airbag.

7. The device of claim 6, wherein the gas distributing device includes a fill tube or a fill hose.

8. The device of claim 1, wherein the lateral wall includes a side window of the vehicle.

9. An airbag that is configured to be stored in an at least partially rolled up condition in an area of a roof rail of a vehicle,
wherein the airbag is configured to inflate in the case of an accident by a gas generator so that the airbag deploys in the area between the head of a passenger and a lateral wall of the vehicle and protects the head of the passenger against colliding with the lateral wall,
wherein at least a portion of the airbag is rolled up in a prescribed winding direction to form an airbag roll arranged so that the side of the airbag configured to face the passenger after deployment of the airbag faces outward in the roll and the side of the airbag configured to face the lateral wall after deployment of the airbag faces inward in the roll, and
wherein the winding direction of the airbag in the airbag roll is reversed at least once to thereby form of an inner first airbag roll which is rolled up in an outer second airbag roll of the opposite rolling direction.

10. The airbag of claim 9, wherein the airbag is rolled up so that the airbag roll unrolls and deploys at a level in the vicinity of a head of a passenger.

11. The airbag of claim 9, wherein the lateral wall includes a side window of the vehicle.

12. The airbag of claim 9, wherein the inner airbag roll has the prescribed rolling direction and is arranged such that, when the airbag is inflated, it unrolls in an area at the level in the vicinity of the head of the passenger.

13. The airbag of claim 9, wherein the outer airbag roll has the prescribed rolling direction and is arranged such that upon the inflation of the airbag it unrolls in an area at the level in the vicinity of the head of the passenger.

14. The airbag of claim 9, wherein a module sheath surrounds the airbag.

15. The airbag of claim 9, further comprising:
a gas distributing device located between the airbag and the gas generator to thereby ensure uniform distribution of gas into the airbag.

16. The airbag of claim 15, wherein the gas distributing device includes a fill tube or a fill hose.

17. An airbag that is configured to be stored in an at least partially rolled up condition in an area of a roof rail of a vehicle,
wherein the airbag is configured to inflate in the case of an accident by a gas generator so that the airbag deploys in the area between the head of a passenger and a lateral wall of the vehicle and protects the head of the passenger against colliding with the lateral wall,
wherein at least a portion of the airbag is rolled up in a prescribed winding direction to form an airbag roll arranged so that the side of the airbag configured to face the passenger after deployment of the airbag faces outward in the roll and the side of the airbag configured to face the lateral wall after deployment of the airbag faces inward in the roll, and
wherein the airbag has an accordion folded portion, and
wherein said airbag roll forms an outer airbag roll that contains the accordion folded portion.

18. The airbag of claim 17, wherein the airbag is rolled up so that the airbag roll unrolls and deploys at a level in the vicinity of a head of a passenger.

19. The airbag of claim 17, wherein the lateral wall includes a side window of the vehicle.

20. The airbag of claim 17, wherein a module sheath surrounds the airbag.

* * * * *